United States Patent [19]
Phillips, Jr.

[11] 3,848,834
[45] Nov. 19, 1974

[54] PARACHUTE ASSEMBLY

[76] Inventor: Sam B. Phillips, Jr., 9150 Gulf Freeway, Houston, Tex. 77017

[22] Filed: Mar. 22, 1971

[21] Appl. No.: 126,918

Related U.S. Application Data

[63] Continuation of Ser. No. 763,762, Sept. 30, 1968, abandoned.

[52] U.S. Cl. ................................ 244/145, 244/149
[51] Int. Cl. ............................................. B64d 17/06
[58] Field of Search ........... 244/142, 145, 148, 147, 244/149, 152, DIG. 1; 46/86

[56] References Cited
UNITED STATES PATENTS

| | | | |
|---|---|---|---|
| 454,325 | 6/1891 | Brandt | 244/142 |
| 1,277,980 | 9/1918 | Martyna | 244/142 |
| 1,795,168 | 3/1931 | Habermehl | 244/148 |
| 2,046,387 | 7/1936 | Knight | 244/145 |
| 2,048,159 | 7/1936 | Hoffman | 244/142 |
| 2,053,342 | 9/1936 | Knight | 244/145 |
| 2,362,488 | 11/1944 | Jahn | 244/148 |
| 2,396,126 | 3/1946 | Quilter et al. | 244/148 |
| 2,519,964 | 8/1950 | Helms | 244/142 |
| 2,601,343 | 6/1952 | Thilen | 244/145 |
| 2,651,481 | 9/1953 | Steinthal | 244/145 |
| 2,760,741 | 8/1956 | Tauty | 244/148 |
| 2,919,085 | 12/1959 | Horning | 244/142 |
| 2,997,263 | 8/1961 | Forichon | 244/145 |
| 3,228,635 | 1/1966 | Hughes et al. | 244/145 |

FOREIGN PATENTS OR APPLICATIONS

| | | | |
|---|---|---|---|
| 562,279 | 11/1923 | France | 244/152 |
| 612,313 | 10/1926 | France | 244/142 |
| 206,084 | 3/1955 | Australia | 244/145 |

Primary Examiner—Trygve M. Blix
Assistant Examiner—Gregory W. O'Connor
Attorney, Agent, or Firm—Torres & Berryhill

[57] ABSTRACT

A flat rectangular canopy with crossed reinforcing webbing sewn to the canopy and having depending suspension lines extending to H-risers. A deployment line is attached to the two central intersections of the webbing strips to assist in opening the canopy when it is dropped and the canopy is folded to form two air pockets which also assist in its initial opening.

1 Claim, 8 Drawing Figures

Sam B. Phillips, Jr.
INVENTOR

BY Carlos A. Torres

ATTORNEY

PATENTED NOV 19 1974 3,848,834

Sam B. Phillips, Jr.
INVENTOR

BY Carlos A. Torres

ATTORNEY

PARACHUTE ASSEMBLY

This is a continuation of application Ser. No. 763,762, filed Sept. 30, 1968, now abandoned.

BACKGROUND OF THE INVENTION

1. Field of the Invention

The present invention relates to means for dropping objects from heights. More particularly, the present invention relates to a new and improved parachute for dropping equipment and personnel from air craft.

2. Description of the Prior Art

Conventional parachutes employed for dropping cargo and personnel generally include a circular, cupped canopy with suspension lines depending from equally spaced locations about the canopy edge. While such parachutes have been extensively employed and are suitable for many purposes, they are characterized by relatively expensive manufacturing requirements and complex packing procedures. Moreover, the load supported by parachutes of this prior art design often oscillate as they fall causing significant damage upon landing impact. Still another problem associated with this conventional parachute is its tendency to drift when falling thus making accurate placement difficult and its tendency to remain open and drag the load after landing.

The prior art has suggested various remedies to the foregoing inherent problems in conventional parachutes, however, the suggested designs have generally been relatively complex and often require elaborate packing techniques to insure proper initial deployment of the parachute. One such prior art parachute avoids the drift problem by employing different length suspension lines and a pilot parachute connected to the main canopy for supporting the load along the initial portion of its fall. Shortly before landing, a timing mechanism releases the main canopy to slow the rate of descent of the load to prevent damage thereto upon impact. By this means, the effects of drift are substantially reduced during the major portion of the load's descent, thereby permitting more accurate placement of the load within a desired landing area. Proper functioning of the described parachute requires proper packing of the canopy and included pilot chute as well as a suitable timing device for opening the main canopy. It is also important to the proper functioning of the parachute that the various suspension lines employed be of different lengths with a line of the proper length being secured in a specific manner between the main canopy and the load supporting risers.

Still another prior art parachute design employs a series of panels secured to each other to form a canopy, with air vents formed between each panel. Because of this composite construction, the canopy requires a relatively complex system of reinforcing webbing to ensure adequate supporting strength. The edges of the canopy are secured to different length suspension lines which extend to the load supporting risers and permit the canopy to take on a curvilinear form as it descends.

To the extent that is known to the applicant, the prior art has been relatively successful in solving certain individual problems inherent in the conventional circular cupped design, however, such prior art fails to disclose in a single design, a parachute which is of simple inexpensive construction, is easily packed by inexperienced personnel and which is also drift and oscillation free.

SUMMARY OF THE INVENTION

A flat, rectangular canopy is provided with a reinforcing tape about its outer edges and four crossed reinforcing webbing bands forming two intersection points secured along its flat surface. A deployment line which assists in the inital opening of the canopy is secured between the two intersection points of the webbing bands.

The outer ends of the webbing are looped to provide attachment points for eight suspension lines. The suspension lines extend from the webbing loops to H-shaped risers which are employed for supporting the load.

In packing the parachute of the present invention, the deployment line is secured by a breakable line to a static line which extends through the open bottom of a deployment bag and through an opening in the top of the bag. The bag is also permanently secured to the static line. The canopy is first flat folded and then long folded, and thereafter S-folded into the deployment bag. The suspension lines are then folded with retainer bands and inserted into the bag which is thereafter closed with breakable line.

When the load is dropped from the aircraft, the static line remains secured thereto and the weight of the load breaks the bag closure line permitting the suspension lines and canopy to be pulled free. After the suspension lines and canopy are extended, the deployment line is popped as it breaks free of the static line. The initial flat and long folding of the canopy forms two air channels therein as it is extended which acts with the popping of the deployment line to completely open the parachute.

The design of the canopy and positioning of the suspension lines cooperate to drop the load with extreme landing accuracy and with virtually no oscillation of the load during descent. The construction of the parachute is simple and inexpensive and the unsupervised packing of the parachute may be accomplished by personnel after only minimal instruction. Moreover, there is no requirement for timing mechanisms, pilot parachutes or complicated suspension systems with the parachute of the present invention and the manner of packing and deploying the parachute minimizes malfunction.

These and other advantages and features of the present invention will be apparent from the following drawings and specification.

DESCRIPTION OF THE PREFERRED EMBODIMENT

Figure 1:
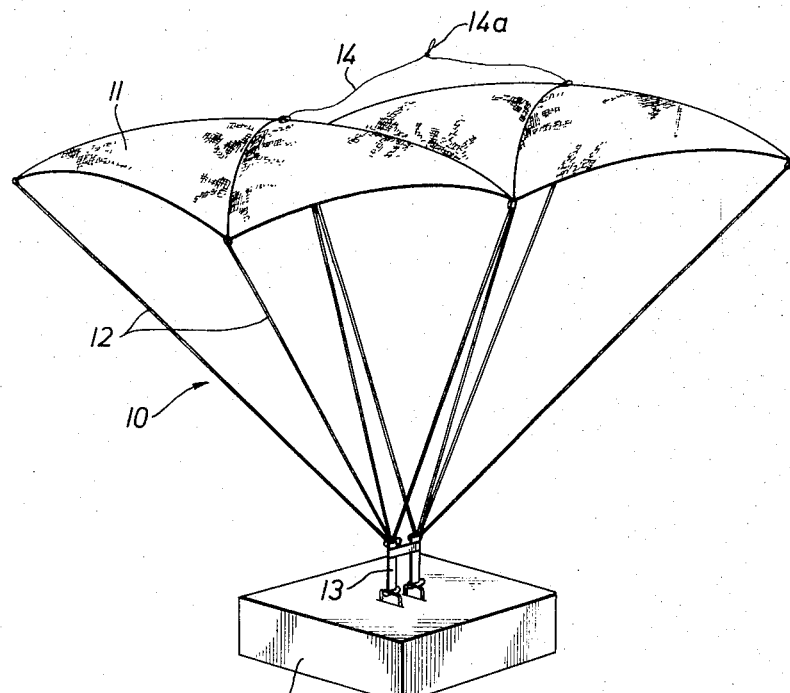
FIG. 1 is a persepctive view of the parachute assembly of the present invention as it appears during its decent.

With reference to FIG. 1, the parachute of the present invention is indicated generally at 10 and includes a canopy 11 having top and bottom surfaces and secured along its edges to depending suspension lines 12. The lower ends of the lines 12 are secured to two spaced attachment points on H-risers 13 with the risers 13 being in turn secured to a load L. A deployment line 14 used to assist in the initial opening of the parachute is secured at spaced locations along the canopy 11. A connection loop 14a is formed at the center of the deployment line 14 and, as will be explained in greater detail hereinafter, is employed for securing the line 14 to a static line.

The canopy 10 is preferably constructed of unshrunk, mercerized airplane cotton with the suspension lines 12 and deployment line 14 constructed of Nylon. It will be understood however that the canopy 11 may be constructed of silk, Nylon, plastic or any other suitable material. Similarly, the suspension lines 12 and deployment line 14 may be constructed of cotton, flexible metals or other suitable material. The H-risers 13 are preferably constructed of Nylon-reinforced, cotton webbing, however, other suitable material may be employed.

Figure 2:
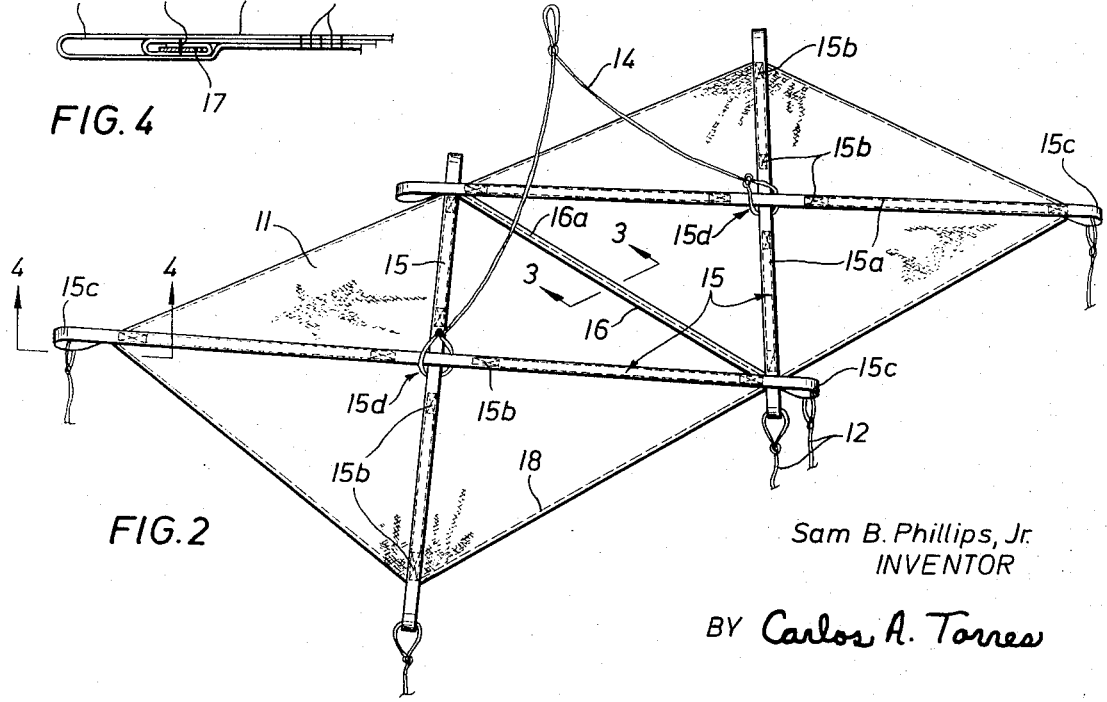
FIG. 2 is an overhead perspective view illustrating details in the construction of the parachute canopy.

As best illustrated in FIG. 2, the canopy 11 is generally rectangular in shape with reinforcing webbing strips 15 secured to the top surface of the canopy by means of stitching 15a. The webbing strips 15 are preferably constructed of double, plain weave Nylon and Nylon thread is preferable for the stitching 15a. Again, it will be understood that other suitable materials may be employed for the webbing strips 15 and stitching 15a.

Box stitches 15b are employed to strengthen the union between the canopy 11 and strips 15 at intermediate positions along the strips and adjacent the ends of each strip.

Figure 3:
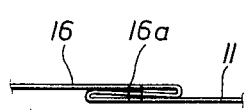
FIG. 3 is a partial cross-section taken along the line 3—3 of FIG. 2.

The rectangular body of the canopy 11 is positively separated into two square sections by a central seam 16 having stitching 16a. With reference to FIG. 3, it may be seen that the seam 16 is formed by doubling the canopy 11 back on itself and securing it in place with stitching 16a. It should be noted that while only a single line of stitching 16a is illustrated, in the actual construction of the parachute, any number of stitching lines may be employed.

Figure 4:
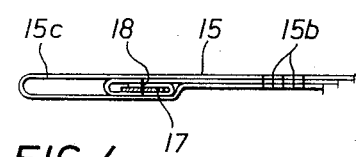
FIG. 4 is a partial cross-section taken along the line 4—4 of FIG. 2.

The edges of the canopy 11 are provided with reinforcing which is best illustrated in FIG. 4. A reinforcing lateral tape band 17 is rolled within the edges of the canopy 11 and held in place by stitching 18. The tape band 17 is preferably constructed of a tubular single woven spun Nylon filling or other suitable material. The tape band 17 and stitching 18 prevent fraying or tearing of the canopy 11, and assist in maintaining the desired canopy configuration during descent.

Referring jointly to FIGS. 2 and 4, it may be seen that the strips 15 are folded at their ends and extend around the lateral tape band 17 where they are secured by the box stitches 15b. This csnstruction forms loops 15c to which the suspension lines 12 are secured. In practice, a safety bowline knot is employed in securing all lines of the parachute assembly, however, any suitable means may be employed.

It may be noted with reference to FIG. 1 that all of the suspension lines 12 adjacent one of the two canopy sections are secured as a group to one of the spaced attachment points on the H-risers 13 while the lines 12 from the other section of the canopy are secured to the second attachment point of the risers 13. This construction insures proper deployment of the canopy and also assists in maintaining the desired canopy configuration during descent.

With reference specifically to FIG. 2, the strips 15 extend diagonally across and intersect at the center of each section of the canopy. The central portions of the strips 15 are devoid of stitching in the area of the two intersection points, with box stitches 15b formed at the end of each unsecured section of the strips. The box stitches 15b provide reinforcing and the free portions of the strips 15 form attachments 15d which are employed to secure the ends of the deployment line 14.

Figure 5:
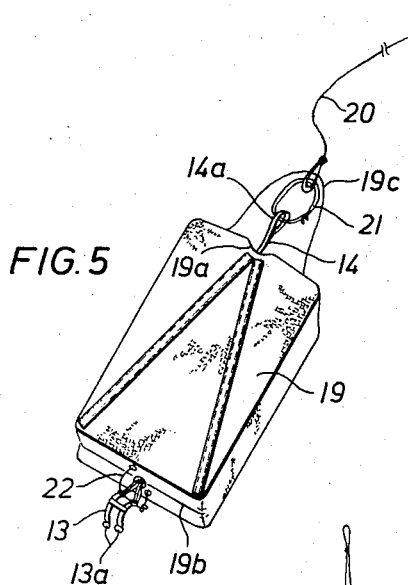
FIG. 5 is a perspective view illustrating the parachute assembly of the present invention packaged in a deployment bag.

FIG. 5 illustrates the parachute assembly of the present invention as it appears when packaged. The parachute canopy 11, suspension lines 12 and deployment line 14 are enclosed within a flat deployment bag 19. The top of the bag 19 is provided with an opening 19a through which the loop 14a of the deployment line 14 extends. The bottom of the bag 19 is also provided with an opening 19b through which the parachute assembly 10 is packed and deployed. The deployment line 14 is releaseably secured to a static line 20 by a double wrap of break cord 21 which extends through the loop 14a. The bag 19 is permanently secured to the static line 20 by means of a line 19c. The lower opening of the bag 19 is held closed by a single wrap of break cord 22 which extends through the bag 19 and through the attachment points of the H-risers 13.

When using the parachute assembly 10 of the present invention, the parachute is packaged as illustrated in FIG. 5 and clevises 13a or other means are employed to secure the load L to the lower end of the H-risers 13. The free end 20a of the static line 20 is then secured to the aircraft structure and the load L is pushed overboard.

Figure 6:
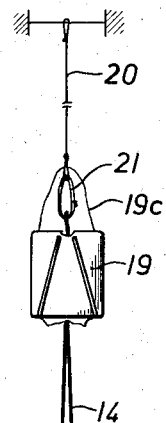
FIG. 6 is an elevation illustrating the inital deployment of the parachute assembly.

Under the weight of the falling load L, the static line 20 is initially drawn taut and the break cord 22 is severed. Continued falling of the load L pulls the canopy 11 completely out of the bag 19 as illustrated in FIG. 6. The falling load L at this point pops the deployment line 14 thereby assisting the deployment of the canopy 11. The popping force also breaks the cord 21 which frees the assembly 10 and permits it to move into the configuration illustrated in FIG. 1.

Figure 7:
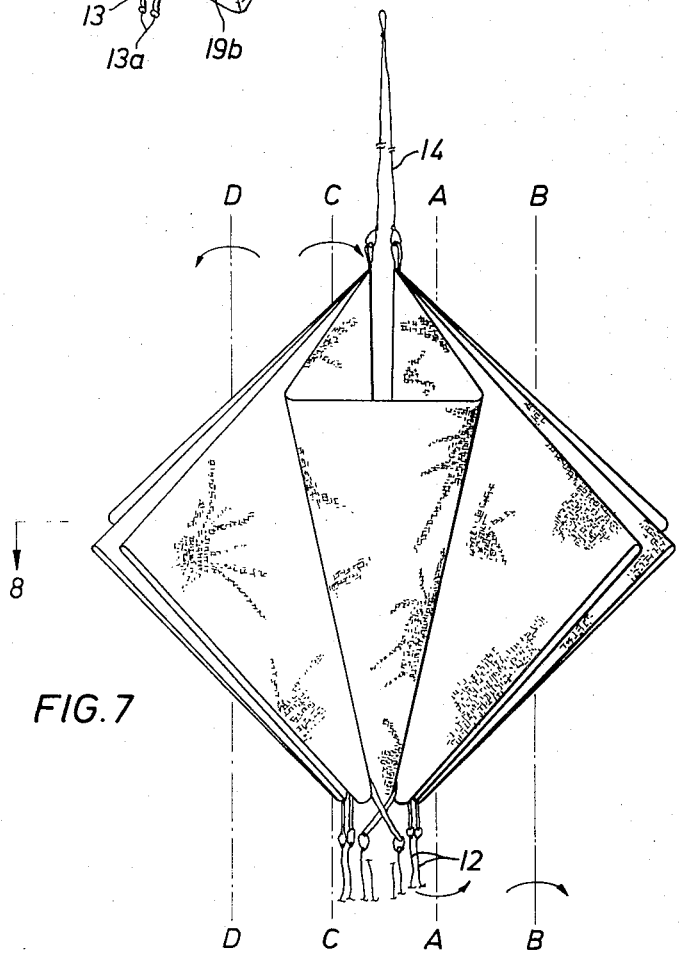
FIG. 7 illustrates details in the folding of the canopy of the parachute.
Figure 8:
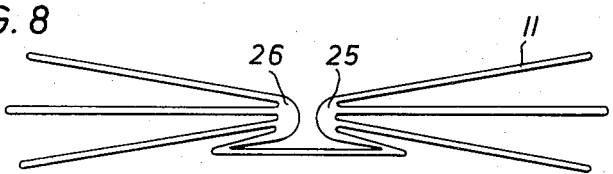
FIG. 8 is a cross-section taken along the line 8—8 of FIG. 7.

The manner of folding the canopy 11 is important to the proper functioning of the parachute. It is important that the canopy begin to deploy as soon as it begins emerging from the deployment bag 19. One method of folding the canopy 10 to achieve this result is illustrated in FIGS. 7 and 8. As illustrated in FIG. 7, the canopy 11 is flat folded with the attachment points of all of the suspension lines 12 positioned at approximately the same location. The body of the canopy 11 is folded into seven triangular sections with three sections on the right, three on the left and a single, centrally disposed section.

As illustrated in FIG. 8, the flat fold produces two air channels 25 and 26 which direct air into the folds of the canopy to assist in its deployment.

With reference to FIG. 7, after the canopy is flat folded, it is then long folded by folding along the fold lines A—A, B—B, C—C and D—D in that order and in the direction indicated by the respective arrows about each fold line. After long folding, the deployment line 14 is secured to the static line 20 and the canopy 11 is then S-folded into the deployment bag 19. If desired, rubber retaining bands or other suitable means may be employed for gathering the suspension lines 12 and deployment line 14 to prevent fouling.

It should be understood that while the primary emphasis of the foregoing description has been placed on cargo or load dropping, the parachute assembly of the present invention is also suitable for personnel usage.

The foregoing disclosure and description of the invention is illustrative and explanatory thereof, and various changes in the size, shape, and materials as well as in the details of the illustrated construction may be made within the scope of the appended claims without departing from the spirit of the invention.

I claim:

1. A parachute assembly comprising:
   a. a flat canopy having a top and a bottom surface;
   b. a plurality of suspension lines secured to said canopy and extending below said bottom surface of said canopy;
   c. deployment means for assisting in opening said canopy secured to said canopy and extending upwardly from said top surface of said canopy;
   d. reinforcing means secured to said canopy with said reinforcing means further including attachment means for securing said suspension lines to said canopy;
   e. first and second rectangular sections included in said canopy;
   f. two centrally crossed webbing strips included in said reinforcing means and secured to each of said first and second rectangular sections with said crossed webbing strips in each section extending diagonally between each corner of said section and with the ends of each of said webbing strips including said attachment means for securing said suspension lines to said canopy; and
   g. a deployment line included with said deployment means disposed above said top surface of said canopy and secured at spaced locations on said top surface of said canopy at the point of intersection of said webbing strips on each of said first and second rectangular sections, said webbing strips in each section being unsecured to said section for a portion of their lengths at the point of intersection of said webbing strips to form attachment means for said deployment line.

* * * * *